United States Patent
Nakazato et al.

(10) Patent No.: US 12,395,926 B2
(45) Date of Patent: Aug. 19, 2025

(54) MANAGEMENT DEVICE, MANAGEMENT METHOD, AND MANAGEMENT PROGRAM

(71) Applicant: RAKUTEN MOBILE, INC., Tokyo (JP)

(72) Inventors: Jin Nakazato, Tokyo (JP); Saki Tanaka, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/802,573

(22) PCT Filed: Aug. 20, 2021

(86) PCT No.: PCT/JP2021/030683
§ 371 (c)(1),
(2) Date: Aug. 26, 2022

(87) PCT Pub. No.: WO2023/021708
PCT Pub. Date: Feb. 23, 2023

(65) Prior Publication Data
US 2024/0196319 A1   Jun. 13, 2024

(51) Int. Cl.
*H04W 48/20* (2009.01)
*H04W 64/00* (2009.01)
(Continued)

(52) U.S. Cl.
CPC ........... *H04W 48/20* (2013.01); *H04W 64/00* (2013.01); *H04W 76/10* (2018.02); *H04W 76/30* (2018.02)

(58) Field of Classification Search
CPC ..... H04W 48/20; H04W 64/00; H04W 76/10; H04W 76/30; H04W 16/32; H04W 36/04
(Continued)

(56) References Cited

U.S. PATENT DOCUMENTS

2009/0316595 A1* 12/2009 Kwon ................... H04W 48/20
                                                                370/252
2011/0250895 A1* 10/2011 Wohlert ................ H04W 4/029
                                                                455/445
(Continued)

FOREIGN PATENT DOCUMENTS

JP   2014-132795 A   7/2014
JP   2015-146541 A   8/2015
(Continued)

OTHER PUBLICATIONS

International Search Report for PCT/JP2021/030683 dated, Sep. 14, 2021 (PCT/ISA/210).

*Primary Examiner* — Khaled M Kassim
*Assistant Examiner* — Oladiran Gideon Olaleye
(74) *Attorney, Agent, or Firm* — Sughrue Mion, PLLC

(57) ABSTRACT

In order to connect a radio terminal in a heterogeneous network environment to a connection destination in an appropriate frequency band, a management device comprises: a located-area information acquisition unit that acquires located-area information of the radio terminal; a first base station identification unit that uses the located-area information to identify a first base station forming a macrocell; a second base station identification unit that uses the located-area information to perform a first assessment for assessing whether or not the radio terminal is within one of the small cells, and that, when the radio terminal is within one of the small cells, identifies a second base station forming the small cell; and a high-speed communication requirement assessment unit that performs a second assessment for assessing whether or not the radio terminal requires high-speed communication based on at least a predicted traffic demand volume from the radio terminal.

7 Claims, 7 Drawing Sheets

(51) Int. Cl.
*H04W 76/10* (2018.01)
*H04W 76/30* (2018.01)

(58) Field of Classification Search
USPC .......................................................... 370/329
See application file for complete search history.

(56) References Cited

U.S. PATENT DOCUMENTS

| | | | |
|---|---|---|---|
| 2013/0337797 A1* | 12/2013 | Ban ....................... | H04W 84/00 455/422.1 |
| 2014/0024378 A1* | 1/2014 | Khude .................... | H04W 8/06 455/437 |
| 2015/0223123 A1 | 8/2015 | Tomiyasu | |
| 2017/0105162 A1* | 4/2017 | Kim ......................... | H04L 5/14 |
| 2017/0325120 A1* | 11/2017 | Szilagyi .............. | H04L 41/5067 |
| 2017/0339706 A1* | 11/2017 | Andreoli-Fang ..... | H04W 72/51 |
| 2020/0205062 A1* | 6/2020 | Azizi ...................... | H04W 4/46 |

FOREIGN PATENT DOCUMENTS

| | | | |
|---|---|---|---|
| JP | 2015222929 A | * | 12/2015 |
| JP | 2017-147554 A | | 8/2017 |
| KR | 10-2012-0080514 A | | 7/2012 |

* cited by examiner

MANAGEMENT DEVICE, MANAGEMENT METHOD, AND MANAGEMENT PROGRAM

CROSS REFERENCE TO RELATED APPLICATIONS

This application is a National Stage of International Application No. PCT/JP2021/030683 filed Aug. 20, 2021.

TECHNICAL FIELD

The present invention relates to a management device, a management method, and a management program for managing the connection destination of a radio terminal.

BACKGROUND

Radio terminals, represented by smartphones in recent years, provide augmented reality (AR: Augmented Reality) services and the like, which require high-capacity, high-speed communication, while also providing social networking services (SNSs: Social networking services) and the like, which do not require high-capacity, high-speed communication.

Conventionally, the base station that is to be the connection destination of a radio terminal is determined based on radio wave conditions.

Patent Document 1, which is an example of conventional art, discloses a heterogeneous network wherein a radio terminal reports, to base stations, measurement information regarding measurement results for reception signals from a base station that is a connection destination and/or adjacent base stations, and said measurement information is used when switching base stations.

CITATION LIST

Patent Literature

Patent Document 1: JP 2014-132795 A

SUMMARY OF INVENTION

Technical Problem

In a heterogeneous network environment, radio terminals are connected to base stations of macrocells, and are connected to base stations of small cells or spot cells by handover in accordance with the radio wave conditions.

However, if the base station that is the connection destination is determined in accordance with only the radio wave conditions, then there is a possibility that even radio terminals not requiring high-capacity, high-speed communication will be connected to the base stations of small cells or spot cells, causing the number of users connected to the base stations of small cells or spot cells to increase excessively.

For this reason, there was a problem in that providing the necessary throughput to radio terminals requiring high-capacity, high-speed communication was difficult.

The present invention was made in consideration of the above, and an objective thereof is to provide technology for connecting radio terminals to connection destinations in appropriate frequency bands in a heterogeneous network environment.

Solution to Problem

One embodiment of the present invention that solves the above-mentioned problem and that achieves the objective is a management device for managing a connection destination of a radio terminal in a heterogeneous network environment formed by a macrocell using a low frequency band and one or a plurality of small cells using a frequency band higher than the low frequency band, wherein the management device comprises: a located-area information acquisition unit that acquires located-area information of the radio terminal; a first base station identification unit that uses the located-area information to identify a first base station forming the macrocell; a second base station identification unit that uses the located-area information to perform a first assessment for assessing whether or not the radio terminal is within one of the small cells, and that, when the radio terminal has been assessed to be within one of the small cells, identifies a second base station forming the small cell; a high-speed communication requirement assessment unit that performs a second assessment for assessing whether or not the radio terminal requires high-speed communication based on at least a predicted traffic demand volume from the radio terminal; a session setting determination unit that determines that a session between the radio terminal and the second base station is to be established or terminated based on results of the second assessment in the high-speed communication requirement assessment unit; and a connection destination control unit that controls a connection between the radio terminal and the second base station based on results of the determination in the session setting determination unit.

In one embodiment of the present invention, predicted traffic demand volume is determined based on user attribute information, and the user attribute information includes at least one of user information, calendar information, APP information, and hour-of-day information.

In one embodiment of the present invention, a used volume of traffic being used by the radio terminal is further used for the assessment regarding whether or not the radio terminal requires high-speed communication performed by the high-speed communication requirement assessment unit.

In one embodiment of the present invention, if the high-speed communication requirement assessment unit has assessed that high-speed communication is not required, then the session setting determination unit determines that a session between the radio terminal and the second base station is to be terminated.

In one embodiment of the present invention, if the high-speed communication requirement assessment unit has assessed that high-speed communication is required, then the session setting determination unit determines that a session between the radio terminal and the second base station is to be established.

In one embodiment of the present invention, when the first assessment has resulted in an assessment that the radio terminal is not within the small cells, the radio terminal is connected with the first base station.

In one embodiment of the present invention, when the second assessment has resulted in a determination that a session is to be established between the radio terminal and the second base station, the radio terminal is connected with the second base station.

In one embodiment of the present invention, when the second assessment has resulted in a determination that a session between the radio terminal and the second base station is to be terminated, the session between the radio terminal and the second base station is terminated and the radio terminal is connected with the first base station.

Additionally, one embodiment of the present invention is a management method for managing, by using one or a plurality of processors, a connection destination of a radio terminal in a heterogeneous network environment formed by a macrocell using a low frequency band and one or a plurality of small cells using a frequency band higher than the low frequency band, wherein the management method comprises: acquiring located-area information of the radio terminal; using the located-area information to identify a first base station forming the macrocell; using the located-area information to perform a first assessment for assessing whether or not the radio terminal is within one of the small cells, and when the radio terminal has been assessed to be within one of the small cells, identifying a second base station forming the small cell; performing a second assessment for assessing whether or not the radio terminal requires high-speed communication based on at least a predicted traffic demand volume from the radio terminal; determining that a session between the radio terminal and the second base station is to be established or terminated based on results of the second assessment; and controlling a connection between the radio terminal and the second base station based on results of the determination.

In one embodiment of the present invention, a used volume of traffic being used by the radio terminal is further used in the second assessment.

Additionally, one embodiment of the present invention is a management program for making the one or a plurality of processors execute the above-mentioned management method.

Effects of Invention

According to the present invention, radio terminals can be connected to appropriate connection destinations in a heterogeneous network environment.

DESCRIPTION OF EMBODIMENTS

Hereinafter, embodiments of the present invention will be explained with reference to the attached drawings.

However, the present invention is not to be construed as being limited by the descriptions of the embodiments below.

Figure 1:
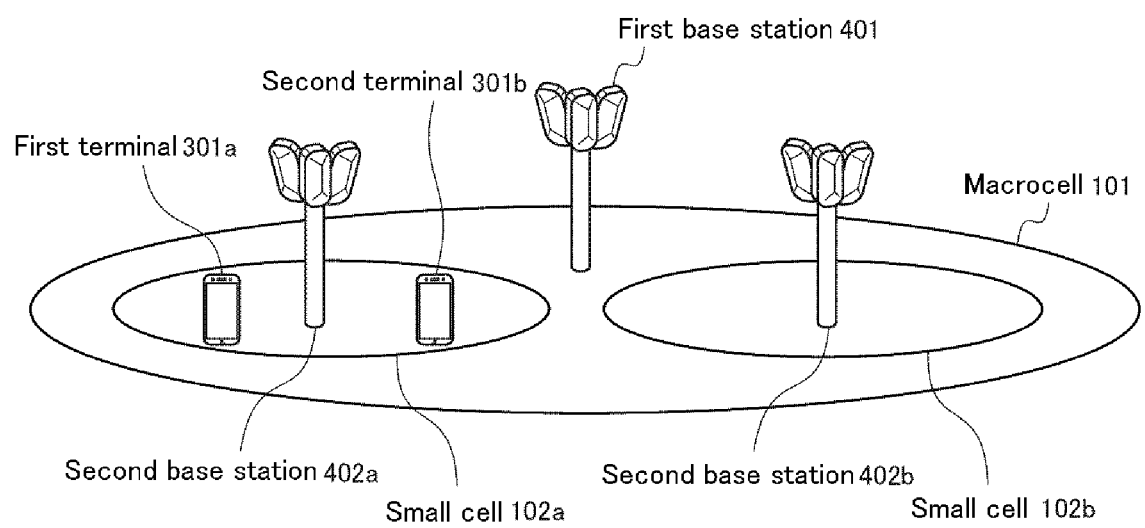
FIG. 1 is a schematic diagram illustrating a communication system in an embodiment.

FIG. 1 is a schematic diagram illustrating a communication system in an embodiment of the present invention.

There are two small cells 102a, 102b (hereinafter referred to collectively as small cells 102) in a macrocell 101 illustrated in FIG. 1.

The present invention is not limited thereto, and there may be one, or three or more small cells 102 in the macrocell 101.

In FIG. 1, the macrocell 101 uses a low frequency band (e.g., 4G).

Additionally, the small cells 102 use a frequency band that is higher than the low frequency band in the macrocell 101.

The macrocell 101 and the small cells 102 form a heterogeneous network environment.

The macrocell 101 is formed by a first base station 401.

Additionally, the small cell 102a is formed by a second base station 402a, and the small cell 102b is formed by a second base station 402b.

The second base station 402a and the second base station 402b will be referred to collectively as the base stations 402.

In FIG. 1, a first terminal (UE: User Equipment) 301a and a second terminal (UE) 301b are located within, i.e., are in the service area of, the small cell 102a within the macrocell 101.

The first terminal 301a and the second terminal 301b will be referred to collectively as the radio terminals 301.

The first base station 401 is provided with a BBU (Base Band Unit) that performs baseband processing.

The second base stations 402a, 402b are provided with DUs (Distributed Units), which are distributed nodes, and a CU (Centralized Unit), which is a centralized node. The functions of the BBU are realized by the DUs and the CU.

Figure 2:
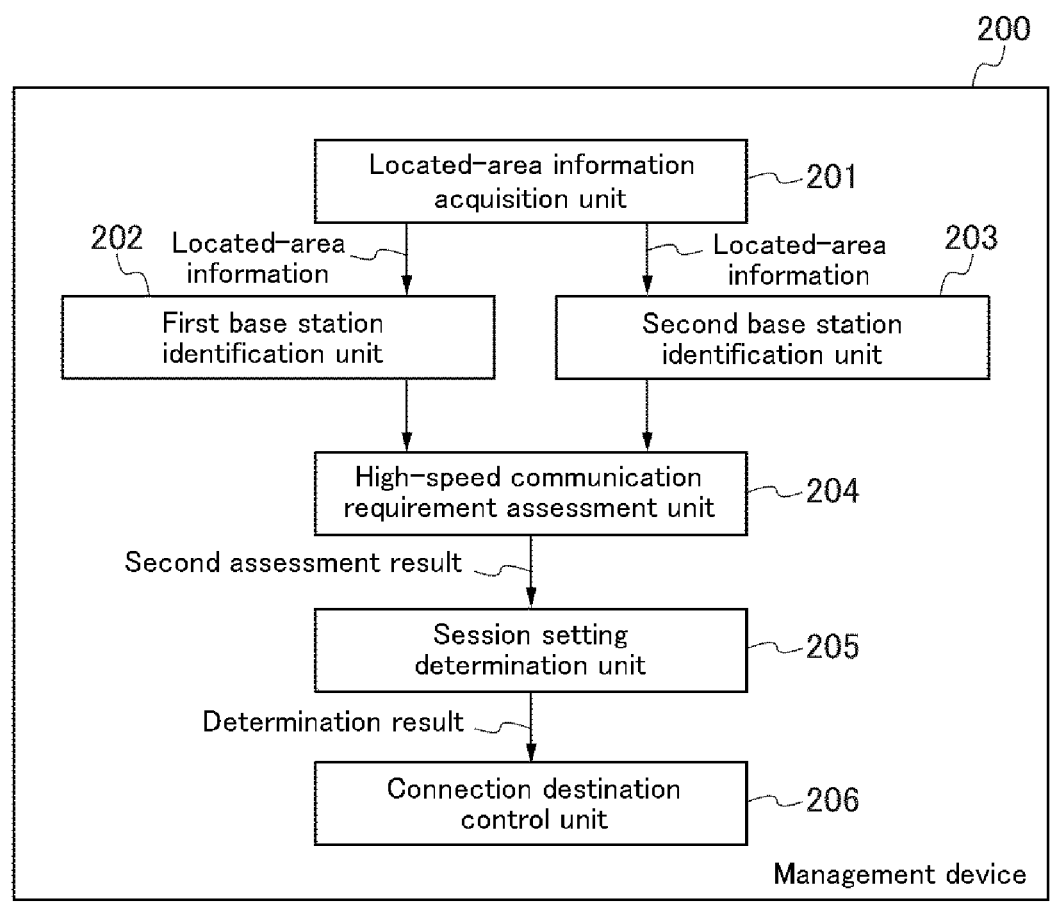
FIG. 2 is a diagram illustrating the configuration of a management device applied to the communication system illustrated in FIG. 1.

FIG. 2 is a diagram illustrating the configuration of a management device 200 applied to the management system illustrated in FIG. 1.

The management device 200 comprises a located-area information acquisition unit 201, a first base station identification unit 202, a second base station identification unit 203, a high-speed communication requirement assessment unit 204, a session setting determination unit 205, and a connection destination control unit 206.

The management device 200 manages the connection destinations of the radio terminals 301 in the heterogeneous network environment.

The management device 200 includes one or a plurality of processors.

The located-area information acquisition unit 201 acquires located-area information of the radio terminals 301.

The located-area information of the first terminal 301a and the second terminal 301b is acquired by being detected based on source IPs (Source IPs).

The first base station identification unit 202 uses the located-area information of the radio terminals 301 to identify the first base station 401 forming the macrocell 101.

The second base station identification unit 203 uses the located-area information of the radio terminals 301 to assess whether or not the radio terminals 301 are within one of the small cells 102.

Hereinafter, this assessment will be referred to as the first assessment.

When, in the first assessment, it has been assessed that the radio terminals 301 are within one of the small cells 102, the second base station identification unit 203 identifies the second base station 402 forming the small cell 102.

When the radio terminals 301 are located in the area of the macrocell 101 and the first assessment has resulted in an assessment that the radio terminals 301 are not within the small cells 102, the radio terminals 301 may be connected with the first base station 401.

The high-speed communication requirement assessment unit 204 assesses whether or not the radio terminals 301 require high-speed communication based on at least the predicted traffic demand volumes (i.e., the future traffic volumes) from the radio terminals 301 (hereinafter, this assessment will be referred to as the second assessment).

In this second assessment, the volumes of the traffic being used by the radio terminals 301 (i.e., the current traffic volumes) may further be used.

In this case, the predicted traffic demand volumes (i.e., the future traffic volumes) are preferably determined based on user information in the radio terminals 301.

The user information includes at least one of user attribute information, calendar information, APP information and hour-of-day information.

If the user is a person, then the user attribute information includes at least one of the person's age, the person's sex, and terminal attribute information associated with attributes of the radio terminal that the person has.

Additionally, the terminal attribute information is information that can be used to predict whether or not the radio terminal is associated with the presence or absence of demand for communication with a base station capable of high-speed, high-capacity communication.

An example of terminal attribute information is the type of radio terminal.

Examples of types of radio terminals include smartphones, tablet terminals and portable PCs (Personal Computers).

Additionally, if the user is a vehicle, then the user attribute information includes at least one of the vehicle type of the vehicle, information indicating whether or not the vehicle has the functions (ICT functions) of an ICT (Information and Communication Technology) terminal, and terminal attribute information associated with the attributes of the radio terminal that the vehicle has.

Examples of vehicles provided with terminals having ICT functions include vehicles such as connected cars and unmanned robots, and unmanned aerial vehicles such as drones.

Calendar information includes current date information.

This date information may include information associated with the current date in addition to the current date.

The date information is, for example, information indicating that today is the Y-th day in the month X (the current date), and that the Y-th day in the month X is a day on which a major sporting event that is to be distributed in real-time is to be held (information associated with the current date).

APP information includes information regarding the types of applications installed in the radio terminal 301 and the frequency of use of the applications.

Examples of information regarding the types of applications include information regarding applications capable of playing streamed content, such as video watching applications or music playing applications, and information regarding applications in which the main content is text data, such as SNS (Social Networking Service) applications or text site applications.

In general, applications capable of playing streamed content require high-speed, high-capacity communication, and applications for which the main content is text data do not require high-speed, high-capacity communication.

The APP information may be acquired by an MEC unit to be explained below.

The hour-of-day information includes current time information.

This hour-of-day information may include information associated with the current time in addition to the current time.

The hour-of-day information is information indicating, for example, that if the time is between 12 pm and 1 pm, the radio terminal usage frequency will generally be high because many users are on lunch breaks from 12 pm to 1 pm.

Additionally, the hour-of-day information is information indicating, for example, that if the time is between 3 am and 4 am, the radio terminal usage frequency will generally be low because many users are generally sleeping from 3 am to 4 am.

As mentioned above, the user information includes at least one of user attribute information, calendar information, APP information, and hour-of-day information, and is preferably information combining a plurality of these types of information.

If the user information is information combining two or more of user attribute information, calendar information, APP information, and hour-of-day information, then the accuracy of the predicted traffic demand volume can be improved.

The session setting determination unit 205 determines whether to establish or to terminate a session between a radio terminal 301 and a second base station 402 based on the results of the second assessment in the high-speed communication requirement assessment unit 204.

If the high-speed communication requirement assessment unit 204 has assessed that high-speed communication is not required (second assessment), then the session setting determination unit 205 may determine that the session between the radio terminal 301 and the second base station 402 is to be terminated.

When the second assessment has resulted in a determination that the session between the radio terminal 301 and the second base station 402 is to be terminated, the session between the radio terminal 301 and the second base station 402 may be terminated and the radio terminal 301 may be connected to the first base station 401.

If the high-speed communication requirement assessment unit 204 has assessed that high-speed communication is required (second assessment), then the session setting determination unit 205 may determine that the session between the radio terminal 301 and the second base station 402 is to be established.

When the second assessment has resulted in a determination that the session between the radio terminal 301 and the second base station 402 is to be established, the radio terminal 301 may be connected to the second base station 402.

The connection destination control unit 206 controls the connections between the radio terminals 301 and the second base stations 402 based on the results of the determinations in the session setting determination unit 205.

Figure 3:
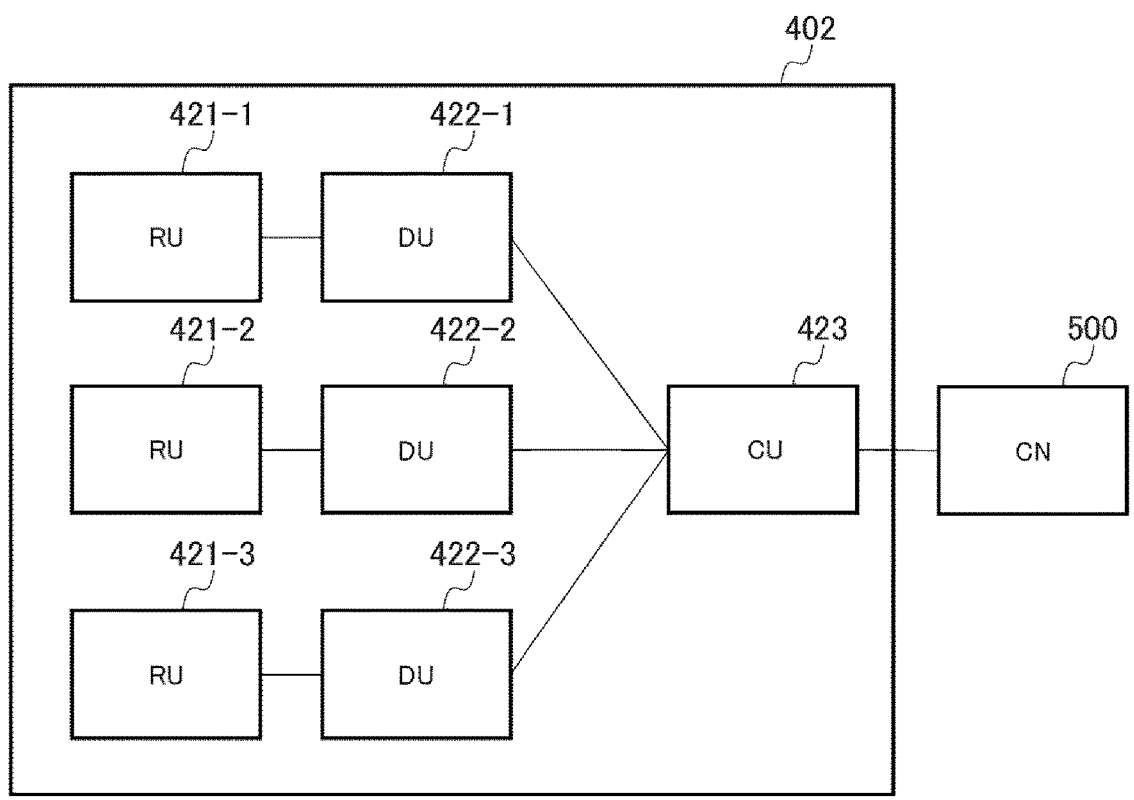
FIG. 3 is a diagram illustrating an example of the configuration of a base station.

FIG. 3 is a diagram illustrating an example of the configurations of the base stations 402.

A base station in a 5G system, known as a gNB, includes RU (Radio Unit) functions, DU (Distributed Unit) functions, and a CU (Central Unit) function.

The DUs 422-1, 422-2, 422-3 (hereinafter referred to collectively as DUs 422) perform processes in layers including at least the physical (PHY) layer.

The CU 423 performs processes in layers including a radio resource control (RRC: Radio Resource Control) layer, which are higher than the layers in which the DUs 422 perform processes.

Multiple DUs 422 may be connected to one CU 423.

Additionally, one or a plurality of RUs 421-1, 421-2, 421-3 (hereinafter referred to collectively as RUs 421) may be connected to one DU 422.

The RUs 421, for example, form one or more beams by beam forming, and use one of the beams to establish a connection with a radio terminal.

That is, the base station 402 is configured to include one CU 423, one or a plurality of DUs 422 connected to the CU 423, and one or a plurality of RUs 421 connected to the DUs 422.

Furthermore, multiple beams are formed by each of the RUs 421 forming one or more beams, and one of the multiple beams that are formed is used to connect the base station 402 with a radio terminal.

The RU functions, the CU function, and the DU functions are known as a radio access network (RAN: Radio Access Network).

The CU 423 in the RAN is connected to a core network (CN: Core Network) 500.

Additionally, the DU functions and the CU function in the base station 402 may be configured by virtualization.

By virtualizing the DU functions to form a virtualized DU (vDU) and virtualizing the CU function to form a virtualized CU (vCU) in the base station 402, dedicated servers can be replaced with a general-purpose server, and the base station 402 can be inexpensively and flexibly constructed.

The DU functions and the CU function must be installed on the same dedicated server.

Thus, in the case in which the DU functions and the CU function are not virtualized, the dedicated server needs to be replaced even if a problem has occurred in just one of the DU functions and the CU function.

However, if the DU functions and the CU function are virtualized, then the virtualized DU (vDU) and the virtualized CU (vCU) can be distributively located on different general-purpose servers, allowing the system to be reconstructed after separating out only the server in which the problem has occurred.

For this reason, the impact on service at the time of a malfunction can be suppressed.

Additionally, a general-purpose server on which a virtualized DU (vDU) or a virtualized CU (vCU) is located can be easily changed, thus allowing the load on the general-purpose servers to be flexibly controlled.

Several modes are contemplated for the location of the virtualized DU (vDU) and the virtualized CU (vCU), and the configuration is not limited to that illustrated in FIG. 3.

Figure 4:
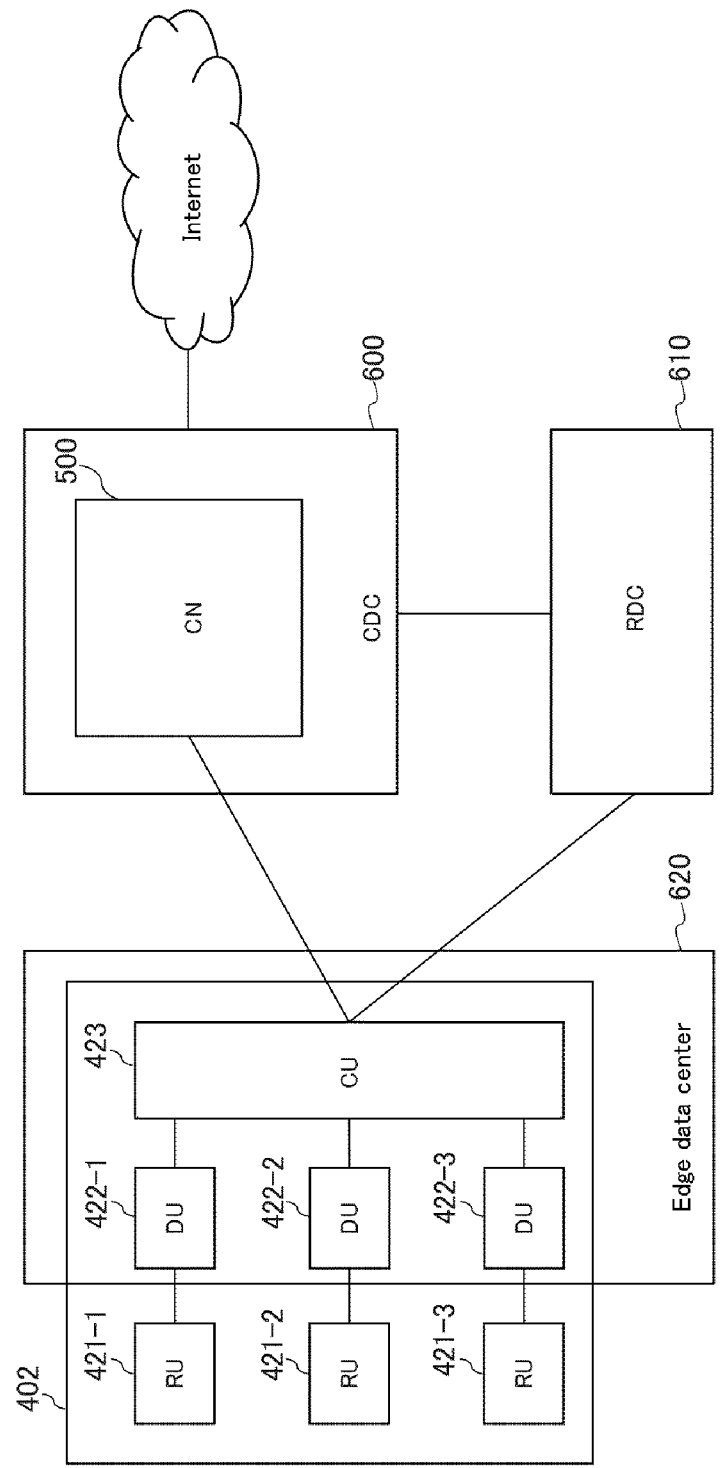
FIG. 4 is a diagram illustrating an example of the configuration of a radio communication system in an embodiment.

FIG. 4 is a diagram illustrating an example of the configuration of a radio communication system in the present embodiment.

As illustrated in FIG. 4, a group of data centers included in the radio communication system in the present embodiment is classified into a CDC (Central Data Center) 600, which is a central data center, an RDC (Regional Data Center) 610, which is a regional data center, and an edge data center 620.

There are multiple CDCs 600, for example, distributively located in the area (for example, Japan) covered by the radio communication system.

As CDCs 600, there are 5GCs (5th-Generation Core networks), which are core networks in 5G systems, EPCs (Evolved Packet Cores), which are core networks in 4G systems, and OSSs (Operation Support Systems)/BSSs (Business Support Systems), etc.

There are, for example, several tens of RDCs 610 distributively located in the area covered by the radio communication system.

For example, in the case in which the area covered by the radio communication system is the entire country of Japan, one or two RDCs 610 may be located in each prefecture.

Several thousand edge data centers 620 are distributively located in the area covered by the radio communication system.

FIG. 4 illustrates an example in which the DUs and the CU of the base station 402 are located in an edge data center 620.

However, if virtualization technology is applied to the RAN, then the virtualized CU (vCU) may be located in an RDC 610.

The configuration in the present embodiment may be flexibly located in an edge data center 620 or an RDC 610 in accordance with the location of the virtualized DU (vDU) and the virtualized CU (vCU) in the base station 402.

Additionally, in the case in which MEC (Multi-access Edge Computing) is to be located in an edge data center 620 or an RDC 610, part of the configuration in the present embodiment may be provided in the MEC.

Figure 5:
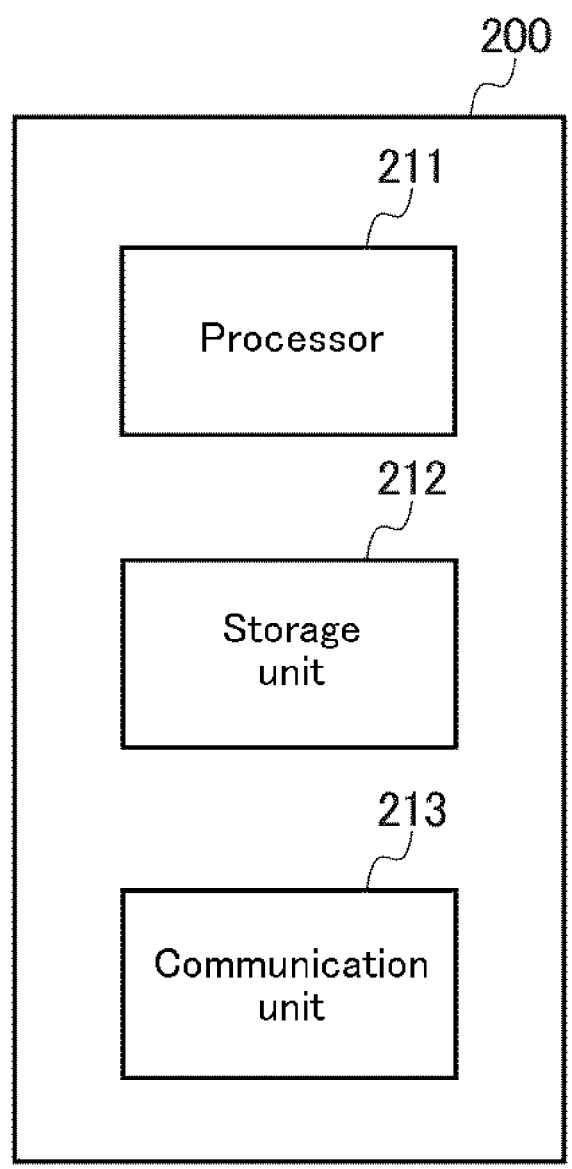
FIG. 5 is a diagram illustrating a configuration for realizing a management device according to an embodiment.

FIG. 5 is a diagram illustrating a configuration for realizing the management device 200 according to the present embodiment.

The management device 200 includes a processor 211, a storage unit 212, and a communication unit 213.

There may be one or a plurality of each of the processor 211, the storage unit 212, and the communication 213 in the management device 200.

Additionally, the processor 211, the storage unit 212, and the communication unit 213 may be located together in each of the places where the configuration of the management device 200 is located.

The processor 211 is a device for performing processes in accordance with a program installed in the management device 200, examples of which include an MPU (Micro Processing Unit) and a CPU (Central Processing Unit).

The storage unit 212 is a device in which a program or the like to be executed by the processor 211 is stored, examples of which include a ROM (Read Only Memory), a RAM (Random Access Memory), a solid-state drive (SSD: Solid State Drive), and a hard disk drive (HDD: Hard Disk Drive).

The communication unit 213 is a communication interface for exchanging data, examples of which include an NIC (Network Interface Card) and a wireless LAN module.

SDN (Software-Defined Networking) may also be installed on the communication unit 213.

Figure 6:
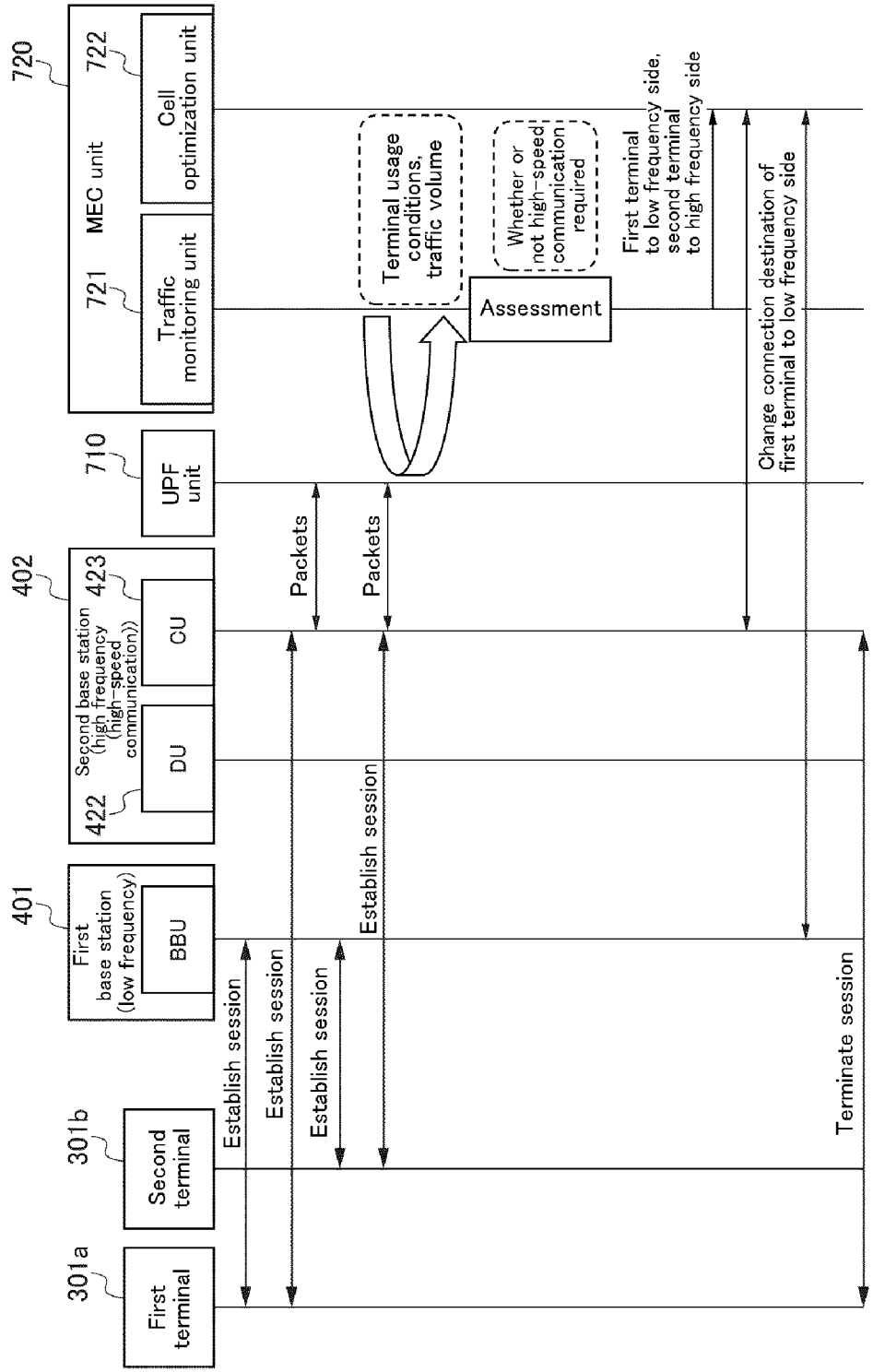
FIG. 6 is a diagram illustrating an assessment logic sequence in the radio communication system in an embodiment.

FIG. 6 is a diagram illustrating an assessment logic sequence in the radio communication system according to the present embodiment.

FIG. 6 illustrates an assessment logic sequence for the case in which the predicted traffic demand volume in the first terminal 301a is high and the predicted traffic demand volume in the second terminal 301b is low.

First, the first terminal 301a and the second terminal 301b each establish a session with the BBU in the first base station 401 and establish a session with the CU 423 in the second base station 402.

The CU 423 in the second base station 402 exchanges packets with a UPF (User Plane Function) unit 710 in the CN 500.

Additionally, an MEC (Multi-Access Edge Computing) unit 720 in the CN 500 includes a traffic monitoring unit 721 and a cell optimization unit 722.

The traffic monitoring unit 721 acquires the usage conditions and the traffic volume in the first terminal 301a and the second terminal 301b, and assesses whether or not high-speed communication is required based on the usage conditions and the traffic volume that have been acquired.

In this case, the traffic volume includes at least the predicted traffic demand volume (i.e., the future traffic volume) from the radio terminal 301, and may further include the used volume of traffic currently being used by the radio terminal 301.

The cell optimization unit 722 in the MEC unit 720 assigns each of the first terminal 301a and the second terminal 301b to the low frequency side or to the high frequency side based on the results of the assessment regarding whether or not high-speed communication is required.

In this case, the predicted traffic demand volume in the first terminal 301a is high and the predicted traffic demand volume in the second terminal 301b is low. Thus, the first terminal 301a is assigned to the low frequency side and the second terminal 301b is assigned to the high frequency side.

As a result thereof, the session between the first terminal 301a and the CU 423 in the second base station 402 is terminated, and the necessary throughput can be provided to the second terminal 301b, which requires high-capacity, high-speed communication.

Alternatively, if the predicted traffic demand volume in the first terminal 301a is low and the predicted traffic demand volume in the second terminal 301b is high, then the session between the second terminal 301b and the CU 423 in the second base station 402 is terminated, and the necessary throughput can be provided to the first terminal 301a, which requires high-capacity, high-speed communication.

In the description above, the case in which the necessary throughput is provided to radio terminals requiring high-capacity, high-speed communication by establishing and terminating sessions between the radio terminals and the CU in the second base station was described. However, sessions may be established and terminated between the radio terminals and DUs in the second base station.

For example, a DU (or a virtualized DU (vDU)) may be introduced (scaled out) when an event requiring high-capacity, high-speed communication starts in a radio terminal, and a DU (or a virtualized DU (vDU)) may be deleted (scaled in) when the event ends.

As described above, according to the present embodiment, radio terminals can be connected to appropriate connection destinations in a heterogeneous network environment.

The present invention is not limited to being a management device 200, and the present invention also includes a management method for managing, by using one or a plurality of processors, a connection destination of a radio terminal 301 in a heterogeneous network environment formed by a macrocell using a low frequency band and one or a plurality of small cells using a frequency band higher than the low frequency band.

Figure 7:
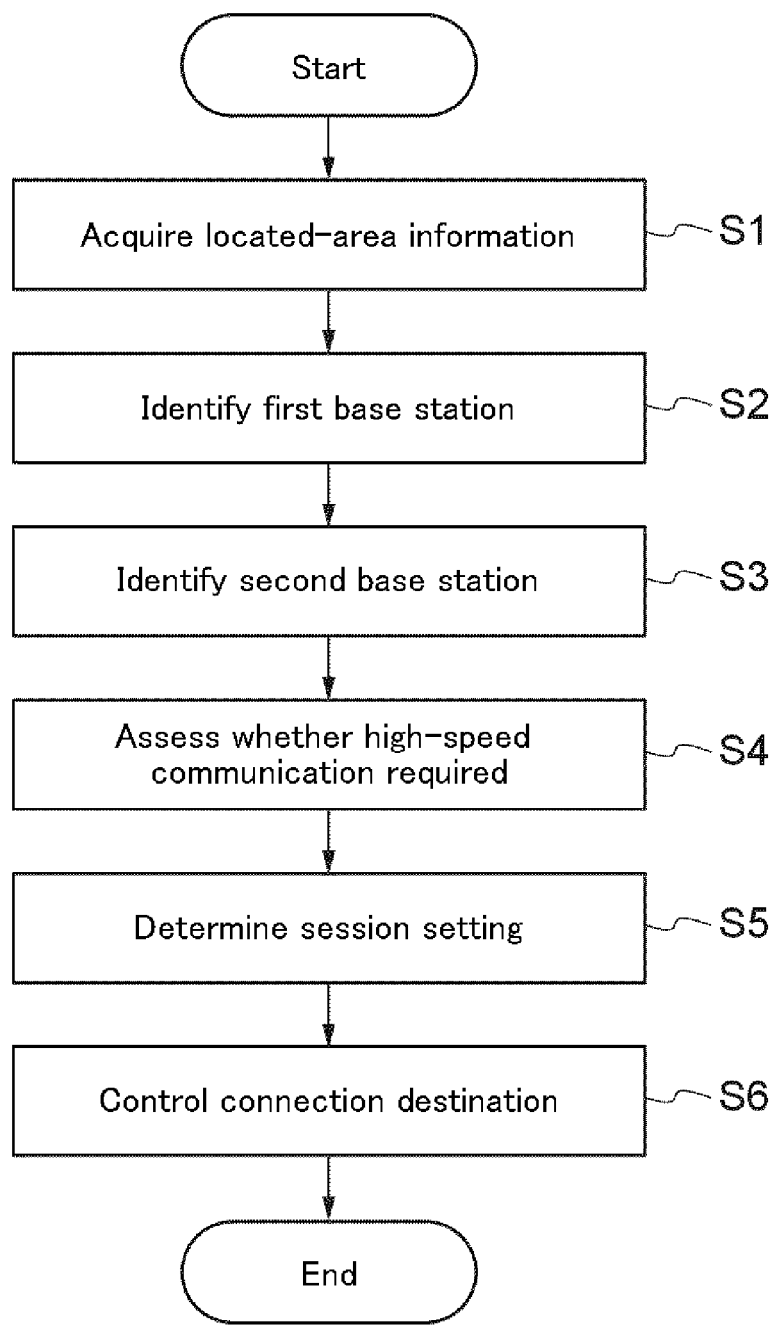
FIG. 7 is a flow chart illustrating a communication system management method according to an embodiment.

FIG. 7 is a flow chart illustrating the communication system management method according to an embodiment of the present invention.

The management method included in the present invention comprises: acquiring located-area information of a radio terminal 301 (S1: acquire located-area information); using the located-area information to identify a first base station 401 forming a macrocell 101 (S2: identify first base station); using the located-area information to perform a first assessment for assessing whether or not the radio terminal 301 is within one of the small cells 102, and when the radio terminal 301 has been assessed to be within one of the small cells 102, identifying a second base station 402 forming the small cell 102 (S3: identify second base station); performing a second assessment for assessing whether or not the radio terminal 301 requires high-speed communication based on at least a predicted traffic demand volume (i.e. a future traffic volume) from the radio terminal 301 (S4: assess whether high-speed communication is required); determining that a session between the radio terminal and the second base station is to be established or terminated based on results of the second assessment (S5: determine session setting); and controlling a connection between the radio terminal and the second base station based on results of the determination (S6: control connection destination).

The used volume of traffic being used by the radio terminal 301 (i.e., the current traffic volume) may be further used for the assessment regarding whether or not the radio terminal 301 requires high-speed communication performed by the high-speed communication requirement assessment unit 204.

The present invention is not limited to the management device and the management method described above, and the present invention also includes a management program.

Specifically, a management program for making one or a plurality of processors execute the respective units in the management device 200 is also included in the present invention.

Additionally, the present invention is not limited to the embodiments described above, and includes various modified examples in which constituent elements have been added, removed or replaced with respect to the configurations indicated above.

REFERENCE SIGNS LIST

101 Macrocell
102, 102a, 102b Small cell
200 Management device
201 Located-area information acquisition unit
202 First base station identification unit
203 Second base station identification unit
204 High-speed communication requirement assessment unit
205 Session setting determination unit
206 Connection destination control unit
211 Processor
212 Storage unit
213 Communication unit
301 Radio terminal
301a First terminal
301b Second terminal
401 First base station
402, 402a, 402b Second terminal
421, 421-1, 421-2, 421-3 RU
422, 422-1, 422-2, 422-3 DU
423 CU
500 CN
600 CDC
610 RDC
620 Edge data center
710 UPF unit
720 MEC unit
721 Traffic monitoring unit
722 Cell optimization unit

The invention claimed is:

1. A management device for managing a connection destination of a radio terminal in a heterogeneous network environment formed by a macrocell using a low frequency band and one or a plurality of small cells using a frequency band higher than the low frequency band, wherein the management device comprises one or more processors configured to:

acquire located-area information of the radio terminal;

use the located-area information to identify a first base station forming the macrocell in which the radio terminal is located;

use the located-area information to perform a first assessment for assessing whether or not the radio terminal is within one of the small cells, and when the radio terminal has been assessed to be within a small cell among the one or the plurality of small cells, identify a second base station forming the small cell in which the radio terminal is located;

perform a second assessment for assessing whether or not the radio terminal requires high-speed communication based on at least a predicted future traffic demand volume from the radio terminal, and a current traffic demand from the radio terminal;

determine that a session between the radio terminal and the second base station is to be established or terminated based on results of the second assessment, comprising:
- based on assessing that high-speed communication is not required, determining that a session between the radio terminal and the second base station is to be terminated, and
- based on assessing that high-speed communication is required, determining that the session between the radio terminal and the second base station is to be established; and control a connection between the radio terminal and the second base station based on results of the determination, comprising:
- when the second assessment has resulted in a determination that a session between the radio terminal and the second base station is to be terminated, terminating the session between the radio terminal and the second base station and connecting the radio terminal with the first base station forming the macro cell, and
- when the second assessment has resulted in a determination that a session is to be established between the radio terminal and the second base station, connecting the radio terminal with the second base station forming the small cell.

2. The management device according to claim 1, wherein the predicted future traffic demand volume is determined based on user attribute information, and
the user attribute information includes at least one of user information, calendar information, application (APP) information, and hour-of-day information.

3. The management device according to claim 1, wherein, when the first assessment has resulted in an assessment that the radio terminal is not within the small cells, the radio terminal is connected with the first base station.

4. The management device according to claim 1, wherein the predicted traffic demand volume is determined based on user information about a user of the radio terminal and includes an age of the user, a sex of the user, and attributes of the terminal used by the user.

5. The management device according to claim 1, wherein the predicted traffic demand volume is determined based on user attribute information, and
the user attribute information includes at least one of user information, calendar information, and hour-of-day information.

6. The management device according to claim 1, wherein the predicted traffic demand volume is determined based on user attribute information, and
the user attribute information includes calendar information, and information about an event associated with the calendar information.

7. A management method for managing, by using one or a plurality of processors, a connection destination of a radio terminal in a heterogeneous network environment formed by a macrocell using a low frequency band and one or a plurality of small cells using a frequency band higher than the low frequency band, wherein the management method comprises:

acquiring located-area information of the radio terminal;

using the located-area information to identify a first base station forming the macrocell in which the radio terminal is located;

using the located-area information to perform a first assessment for assessing whether or not the radio terminal is within one of the small cells, and when the radio terminal has been assessed to be within a small cell among the one or the plurality of small cells, identifying a second base station forming the small cell in which the radio terminal is located;

performing a second assessment for assessing whether or not the radio terminal requires high-speed communication based on at least a predicted future traffic demand volume from the radio terminal, and a current traffic demand from the radio terminal;

determining that a session between the radio terminal and the second base station is to be established or terminated based on results of the second assessment, comprising:
- based on assessing that high-speed communication is not required, determining that a session between the radio terminal and the second base station is to be terminated, and
- based on assessing that high-speed communication is required, determining that the session between the radio terminal and the second base station is to be established; and controlling a connection between the radio terminal and the second base station based on results of the determination, comprising:
- when the second assessment has resulted in a determination that a session between the radio terminal and the second base station is to be terminated, terminating the session between the radio terminal and the second base station and connecting the radio terminal with the first base station forming the macro cell, and
- when the second assessment has resulted in a determination that a session is to be established between the radio terminal and the second base station, connecting the radio terminal with the second base station forming the small cell.

* * * * *